(No Model.)
G. L. SHOREY.
AUTOMATIC REVERSING MECHANISM.
No. 246,916. Patented Sept. 13, 1881.
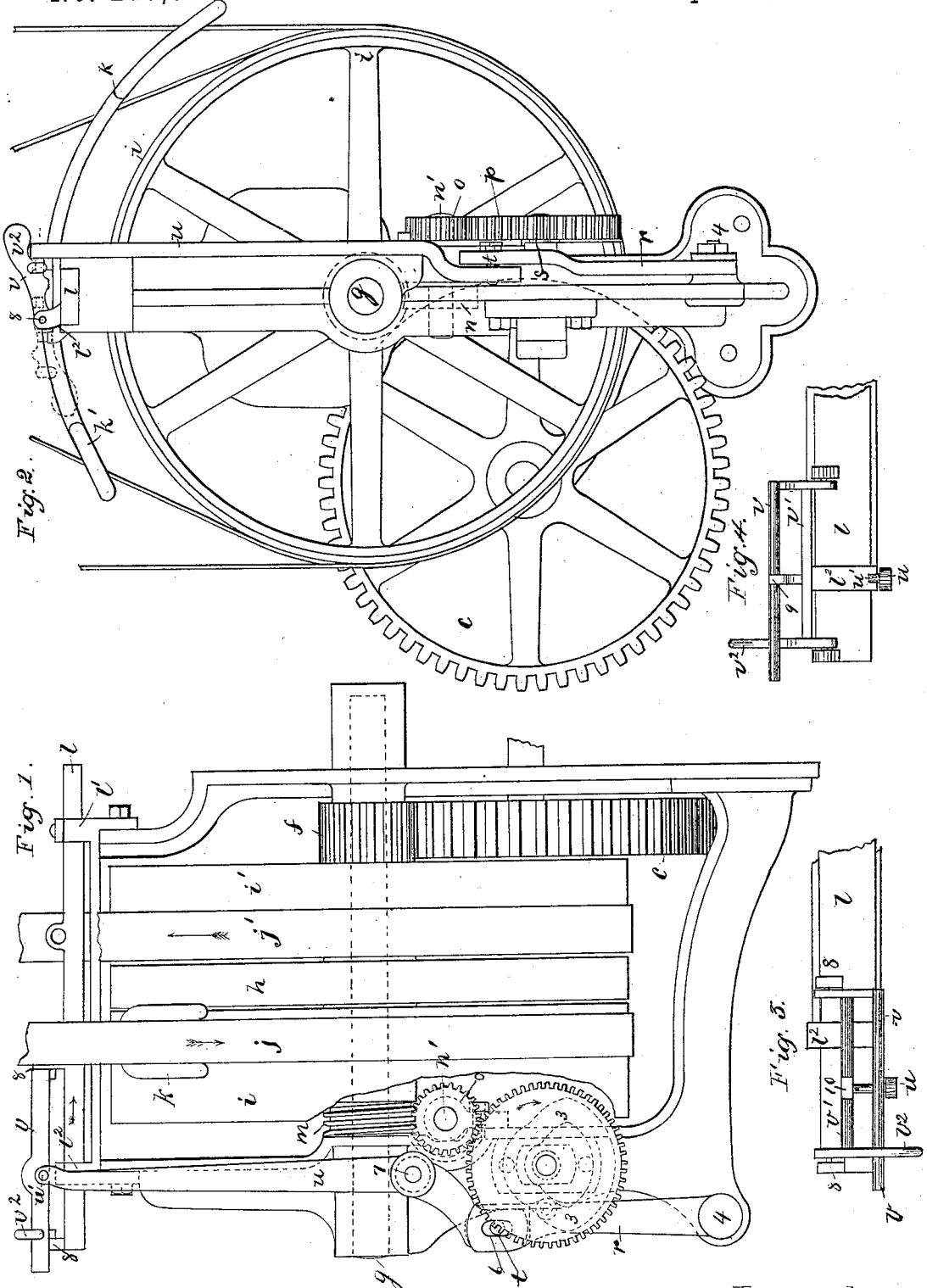
Witnesses.
Lawrence F. Connor.
John F. C. Preinkert
Inventor.
George L. Shorey
by Crosby & Gregory
Attys

UNITED STATES PATENT OFFICE.

GEORGE L. SHOREY, OF LYNN, MASSACHUSETTS.

AUTOMATIC REVERSING MECHANISM.

SPECIFICATION forming part of Letters Patent No. 246,916, dated September 13, 1881.

Application filed June 17, 1881. (No model.)

*To all whom it may concern:*

Be it known that I, GEORGE L. SHOREY, of Lynn, county of Essex, State of Massachusetts, have invented an Improvement in Automatic Reversing Devices, of which the following description, in connection with the accompanying drawings, is a specification.

This invention relates to mechanism for reversing the belts of a reversing-cylinder washing machine or apparatus having an intermittently-reversed rotary movement, in which one of the loose pulleys is continuously driven by one of the belts, whether the said belt be also acting upon the driving-pulley or not, and the said loose pulley is connected by suitable gearing with a cam-wheel provided with a cam-groove that always remains positively engaged with a shipping-lever, which it moves back and forth at stated intervals, to cause it, in operating upon a slide-bar carrying the belt-guides, to change the position of the belts, and thereby reverse the direction of rotation of the machine. The said shipping-lever is provided with a pin or projection to engage an engaging device upon a slide-bar carrying the belt-guide, the said engaging device being movable and adapted, when properly operated, to disengage the said shipping-lever, and in its further movement be brought into engagement with a fixed point upon the frame-work, to lock the slide-bar in proper position to maintain both belts upon the loose pulleys.

I am aware that a shipping-lever operated by mechanism actuated by a loose pulley has been previously employed in connection with a slide-bar that could be detached therefrom and locked upon the frame-work to maintain the belts upon the loose pulleys; but in all such apparatus, as far as I am aware, the connection between the shipping-lever and its actuating loose pulley was not positive, and consequently the slide-bar, together with the shipper, may be moved at any time to stop the machine without disengaging the said slide-bar from the shipper—a thing likely to produce serious accidents. For example, the operator, desiring to stop the machine, might move the slide-bar to the desired position, forgetting, however, to disengage it from the shipper, which would offer no resistance to such movement, and after the machine had been thus stopped and the cylinder perhaps opened the shipper is reached and operated by its actuating mechanism to set the machine in rotation in one direction or the other, thereby probably causing serious damage to the machinery, and possibly even endangering the life of the operator, some portion of whose person is likely to be in the opening of the cylinder and liable to be caught between it and the stationary inclosing suds-box.

This danger is wholly removed by my invention, in which it is impossible to stop the machine without disengaging the slide-bar from the shipper, which is positively held at all times by its actuating-cam, and can only be moved by the said cam, and consequently it is absolutely necessary for the operator to first remove the engaging device from the shipper in order to stop the machine.

Figures 1 and 2 are side and end elevations, respectively, of the driving and reversing gear on a large scale; and Figs. 3 and 4, details illustrating, in plan, the engaging device connected with the slide-bar that carries the belt-guides in its two positions.

The driving-gear $c$, intended to be connected with the cylinder of a washing-machine of usual construction, is engaged and operated by the pinion $f$, fixed on a shaft, $g$, having a narrow driving-pulley, $h$, fixed thereon, and two broad loose pulleys, $i$ $i'$, arranged at either side of the driving-pulley $h$, in the usual manner, each to receive one of the driving-belts $j j'$, moving in opposite directions, while the other one is on the driving-pulley $h$, actuating the machine. The belts are moved to bring each one alternately upon the driving-pulley $h$ by the belt-guides $k k'$, mounted on the slide-bar $l$, moving longitudinally in guides $l'$ $l^2$ upon the frame-work which supports the shaft $g$ and parts constituting the driving and reversing mechanism of the machine.

The belt-guide $k$ is so located relative to the movement of the slide-bar $l$, or the belt $j$ is of such width, that when the said belt is running upon the driving-pulley $h$ to actuate the machine it also laps over upon the loose pulley $i$, which is thus kept continuously running in one direction, regardless of the position of the belts and movement of the driving-pulley $h$ and parts positively connected therewith. The said loose pulley $i$ is provided with a worm, $m$, upon its hub, meshing with the worm-gear $n$, (shown in dotted lines, Fig. 2,) fixed on a spindle, $n'$, which carries a pinion, $o$, meshing with a toothed cam-wheel, $p$, provided with a cam-groove, 3, (shown in dotted lines, Fig. 1,) consisting of two connected circular portions of different radius, but of substantially the same number of degrees.

An arm, $r$, pivoted at 4 upon the frame-work, is provided with a stud, $s$, entering the cam-groove 3, which thus causes the said arm to vibrate back and forth at stated intervals, when the connecting portion of the cam-groove reaches the said stud in the continuous rotation of the cam-wheel $p$, the said arm being positively held in its extreme positions during the intervals between its vibrations by the circular portions of the said cam-groove then passing over the said stud. The said arm $r$ is provided with a slot, 6, at its upper or vibrating end, containing a pin, $t$, engaging a slot in the short arm of the shipping-lever $u$, pivoted at 7 upon the frame-work, it thus being vibrated at stated intervals by the said arm $r$, and positively held in its extreme position between the said vibrations.

An engaging device, pivoted at 8 in lugs upon the slide-bar $l$, consists, mainly, of two bars, $v\ v'$, the former being provided with a notch, 9, which, when in the position shown in full lines, Figs. 1, 2, 3, engages a pin, $u'$, on the lever $u$, thus causing the slide-bar $l$ to be moved longitudinally when the said lever is vibrated, to thus reverse the position of the belts $j\ j'$ on the pulleys $h\ i\ i'$.

The bar $v'$ of the engaging device is provided with a notch, 10, which, when the said engaging device is invested on its pivot 8, as shown in Fig. 4, and dotted lines, Fig. 2, engages a portion of the guide $l^2$ of the slide-bar $l$, thus holding the latter stationary in the position shown in Fig. 1, with the belts $j\ j'$ on the loose pulley $i\ i'$, and consequently not actuating the cylinder of the washing-machine, the shipper-lever $u$ still being vibrated and held stationary at intervals, but no longer operating the slide-bar $l$ and belts, which are disengaged therefrom and locked by the reversal of the engaging device $v\ v'$. This engaging device is provided with a handle, $v^2$, to enable it to be readily reversed, and when held by the operator in an intermediate position, or with the said handle upright, the slide-bar $l$ may be moved back and forth thereby, to operate the belts to check the momentum of the cylinder and bring it to rest with its door beneath the door of the suds-box, when the said engaging device is left in the position shown in Fig. 4 until it is desired to again start the machine. This is done by again reversing the said engaging device and moving it and the connected slide-bar until it is brought into engagement with the pin $u'$; but the bar $v$ is made of such length that it will always fall upon the said pin $u'$ in all positions of the lever $u$ and slide-bar $l$, so that by merely dropping it in the position shown in Fig. 3 the said pin $u'$ will be brought in engagement therewith in the next movement of the lever $u$.

The pin $t$ may be adjusted in the slot 6 of the arm $r$ to change the throw of the lever $u$, if desired; but it is obvious that the said lever may be operated directly by the cam-wheel $p$ if this adjustment were not desired, or the arm $r$ may be dispensed with, and the throw of the upper end of the lever $u$ may be adjusted by changing the position of its pivoted point 7.

By causing the lever $u$ to be always positively held by the action of the continuous cam-groove 3 it is impossible to stop the machine without disengaging the bar $v$ and slide-bar $l$ from the said lever $u$, since when they are engaged the latter will always retain one of the belts, $j$ or $j'$, upon the driving-pulley $h$, except at the moment when it is in the act of interchanging them, as shown in Fig. 1, when the slide-bar $l$ is moving in the direction of the arrow thereon, the machine then stopping only to at once begin moving again in the opposite direction.

I am aware that a reversing-lever has previously been made connected with a slide-bar which might be disengaged from another sliding portion carrying the belt-guides; but in all such apparatus, as far as I am aware, the shipping-lever has been free to turn, except while being actually moved from one position to the other by the mechanism connecting with the continuously-moving loose pulley, and consequently the machine may at any time be stopped by moving both slide-bars and the connected shipping-lever to the position with both belts on the loose pulley without necessarily disengaging the said shipper and belt-controlling slide-bar, so that at the next vibration of the lever the machine will be started.

By disengaging the belt-operating slide-bar from the shipping-lever directly the latter has no work to perform while disengaged; and it is obvious that the construction of the disengaging device may be greatly varied without departing from my invention. For example, the slide-bar $l$ might be disengaged from the lever $u$ by a vertical movement in its bearing $l^2$, the essential feature of this part of my invention being that the entire belt-controlling apparatus is disengaged from the shipping-lever, which has nothing connected with and moved by it while the cylinder is not in movement.

I claim—

1. The two oppositely-moving belts and fixed and loose pulleys therefor, one of the said loose pulleys being continuously revolved in the same direction, and the shipping-lever and connecting mechanism, as described, between it and the said loose pulley, to vibrate the said lever at definite intervals and positively hold it between the said vibrations, combined with the belt-operating slide-bar and engaging device to connect it with or disconnect it from the said shipping-lever, substantially as and for the purpose set forth.

2. The continuously-rotating loose pulley and cam-wheel actuated thereby, combined with the pivoted arm operated by the said cam-wheel, and provided with a pin adjustably connected with its vibrating end, and the shipping-lever engaged and operated by the said pin, whereby the throw of the said shipping-lever may be adjusted, substantially as described.

3. The continuously-revolving loose pulley and shipping-lever actuated thereby, and provided with an engaging-point, combined with the slide-bar and belt-guides thereon, and the pivoted engaging device to co-operate with the said engaging-point, substantially as described.

4. The shipping-lever and its engaging-pin, and the belt-operating slide-bar and engaging device pivoted thereon, and provided on one side with a notch to engage the said pin, and on its other side with a notch to engage a projecting portion of the frame-work, substantially as described.

5. The shipping-lever and its engaging-pin, combined with the belt-operating slide-bar, and engaging device consisting of a bar provided with a notch to engage the said pin, the said bar being of proper length to always rest upon the said pin in any position that can be assumed by the said slide-bar or shipping-lever, substantially as and for the purpose described.

In testimony whereof I have signed my name to this specification in the presence of two subscribing witnesses.

GEORGE L. SHOREY.

Witnesses:
JOS. P. LIVERMORE,
W. H. SIGSTON.